(12) United States Patent
Choi et al.

(10) Patent No.: US 10,534,366 B2
(45) Date of Patent: Jan. 14, 2020

(54) MOVING AND SEARCHING METHOD OF MOBILE ROBOT FOR FOLLOWING HUMAN

(71) Applicant: Korea Institute of Science and Technology, Seoul (KR)

(72) Inventors: Jongsuk Choi, Seoul (KR); Sang-Seok Yun, Seoul (KR); Hoang Minh Do, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 282 days.

(21) Appl. No.: 15/589,023

(22) Filed: May 8, 2017

(65) Prior Publication Data

US 2018/0181137 A1    Jun. 28, 2018

(30) Foreign Application Priority Data

Dec. 23, 2016 (KR) .................. 10-2016-0177931

(51) Int. Cl.
*G06F 19/00* (2018.01)
*G05D 1/02* (2006.01)
(Continued)

(52) U.S. Cl.
CPC ......... *G05D 1/0246* (2013.01); *G05D 1/0212* (2013.01); *G05D 1/0274* (2013.01);
(Continued)

(58) Field of Classification Search
CPC .. G05D 1/0246; G05D 1/0274; G05D 1/0212; G06K 9/00201; G06K 9/00664; G06K 9/6269; G06K 9/4642; G06K 9/3233; G06K 9/00348; G06K 2009/3291; G06K 2209/401; G06K 2209/21; Y10S 901/01
See application file for complete search history.

(56) References Cited

U.S. PATENT DOCUMENTS 7,330,567 B2   2/2008   Hong et al.
9,201,425 B2   12/2015  Yoon et al.
(Continued)

FOREIGN PATENT DOCUMENTS

JP        4455417 B2       4/2010
KR   10-2006-0066975 A    6/2006
(Continued)

*Primary Examiner* — Ian Jen
(74) *Attorney, Agent, or Firm* — NSIP Law

(57) ABSTRACT

A human-following robot for searching a following target when failing to track the following target includes a location estimating module configured to estimate a location of the following target based on map information and trajectory information, a search range setting module configured to set a search range of the following target based on the estimated location information and human walking pattern information, and tracking module configured to track the following target after moving to the search range. Since the robot estimates a location of a missed following target and the moves to the estimated location by utilizing map information and human walking pattern information including walking pattern data of persons in a surrounding environment, which is accumulated during a predetermined period, the following target may be detected again.

20 Claims, 5 Drawing Sheets

(51) Int. Cl.
  *G06K 9/00* (2006.01)
  *G06K 9/32* (2006.01)
  *G06K 9/46* (2006.01)
  *G06K 9/62* (2006.01)

(52) U.S. Cl.
  CPC ..... *G06K 9/00201* (2013.01); *G06K 9/00348* (2013.01); *G06K 9/00664* (2013.01); *G06K 9/3233* (2013.01); *G06K 9/4642* (2013.01); *G06K 9/6269* (2013.01); *G06K 2009/3291* (2013.01); *G06K 2209/21* (2013.01); *G06K 2209/401* (2013.01); *Y10S 901/01* (2013.01)

(56) References Cited

U.S. PATENT DOCUMENTS

| | | | | |
|---|---|---|---|---|
| 2007/0027579 | A1* | 2/2007 | Suzuki | G05D 1/0251 700/245 |
| 2008/0304695 | A1* | 12/2008 | Holm | G06T 5/009 382/100 |
| 2011/0202175 | A1* | 8/2011 | Romanov | A47L 11/4011 700/250 |
| 2012/0316680 | A1 | 12/2012 | Olivier, III et al. | |
| 2014/0249676 | A1* | 9/2014 | Florencio | B25J 9/1694 700/259 |
| 2015/0120128 | A1* | 4/2015 | Rosenstein | A47L 9/2852 701/28 |
| 2015/0217449 | A1* | 8/2015 | Meier | G06N 3/008 700/257 |
| 2015/0283703 | A1* | 10/2015 | Izhikevich | B25J 9/163 706/11 |
| 2016/0075023 | A1* | 3/2016 | Sisbot | G06K 9/00348 700/255 |
| 2016/0334800 | A1* | 11/2016 | Han | G05D 1/0274 |
| 2016/0379074 | A1 | 12/2016 | Nielsen et al. | |
| 2017/0024877 | A1* | 1/2017 | Versace | G06K 9/00664 |
| 2017/0097232 | A1* | 4/2017 | Anderson-Sprecher | G05D 1/021 |

FOREIGN PATENT DOCUMENTS

| | | |
|---|---|---|
| KR | 10-2006-0068001 A | 6/2006 |
| KR | 10-2014-0049152 A | 4/2014 |
| KR | 10-1517359 B1 | 6/2015 |
| KR | 10-2016-0090649 A | 8/2016 |

* cited by examiner

MOVING AND SEARCHING METHOD OF MOBILE ROBOT FOR FOLLOWING HUMAN

CROSS-REFERENCE TO RELATED APPLICATION

This application claims priority to Korean Patent Application No. 10-2016-0177931 filed on Dec. 23, 2016, and all the benefits accruing therefrom under 35 U.S.C. § 119, the contents of which in its entirety are herein incorporated by reference.

BACKGROUND

1. Field

The present disclosure relates to a human-following robot, method and program for searching a location of a target to be followed (hereinafter, referred to as a following target) when failing to track the following target, and more particularly, to a human-following robot, method and program for searching and redetecting a following target by estimating a location of the following target based on map information and trajectory information received from a server and then moving to the estimated location by utilizing walking pattern information.

[Description about National Research and Development Support]

This study was supported by the Robot Industry Source Technology Development Project—Leading Research Support Project of Ministry of Commerce, Industry and Energy, Republic of Korea (Development of recognition technology for identification and behavior of users who are close to 99% recognition rate for 30 users in a real environment based on recognition sensor convergence, Project No. 1415145864) under the Korea Institute of Science and Technology.

2. Description of the Related Art

Techniques for tracking a specific target by using a mobile robot on which a vision sensor such as a camera is loaded are being used in many fields. These techniques may be used for consistently providing information or service to a specific target at a place such as a hospital, a school, a shopping mall, a museum, an exhibition or the like or for caring a specific target. A tracking system for this may basically perform the steps of detecting a target, tracking a location of the target, and following the target at a suitable speed. When performing the steps, techniques such as a laser range finder for detecting and tracking a person are broadly used. The laser range finder outputs depth information in all directions laterally parallel to a sensor, and a tracking system tracks a location of a leg, estimated from the depth information, by using a Kalman filter or the like.

However, in a complicated or crowded place such as in a shopping mall, a museum, an exhibition or the like, the existing technique for detecting and tracking a target by using only the laser range finder may miss the target at unexpected situations, for example when a target to be followed (hereinafter, also referred to as a following target) is hidden by another person or any obstacle placed between the following target and the sensor or when the following target rapidly moves around a corner.

In order to solve this problem, a technique for rapidly redetecting a target by expecting a current location of the target from a depth image photographed by a RGB-D camera when the following target is missed has been studied. However, as time passes longer after missing the following target, it becomes more difficult to expect a current location of the target, and so it is not easy to consistently follow a human in a complicated environment with a large floating population.

SUMMARY

The present disclosure is directed to providing techniques for consistently tracking a target to be followed (hereinafter, referred to as a following target) when failing to track the following target in a complicated or crowded environment with a large floating population such as in a shopping mall, a museum, an exhibition or the like, by estimating a location of the movable following target according to time based on map information received from a server and then moving to the estimated location to redetect the following target by utilizing walking pattern information.

In the existing technique, unless a following target is hidden just in a moment, as time passes longer after missing a following target, it becomes more difficult to expect a current location of the target, and so it is not easy to detect and tract the missing target again in a complicated environment with a large floating population. The present disclosure is directed to solve this problem.

In one aspect, there is provided a human-following robot for searching a target to be followed (hereinafter, referred to as a following target) when failing to track the following target, the human-following robot comprising: a location estimating module configured to estimate a location of the following target based on map information and trajectory information; a search range setting module configured to set a search range of the following target based on the estimated location information and human walking pattern information; and a tracking module configured to track the following target after moving to the search range.

In an embodiment, the map information may include at least one of building interior structure information, furniture arrangement information and surrounding obstacle location information.

In an embodiment, the trajectory information may be based on at least one of a distance, a direction and a speed with which the following target moves before failing to track the following target.

In an embodiment, the human walking pattern information may be learned through walking pattern data of persons in a surrounding environment, which is accumulated during a predetermined period.

In an embodiment, the search range of the following target may be limited by at least one of a width of a passage, the number of passages and a location of an obstacle, included in the map information.

In an embodiment, the human-following robot may further comprise a moving path calculating module configured to calculate a moving path of the robot based on the map information.

In an embodiment, the human-following robot may further comprise an image receiving module configured to receive a depth image and a color image from a camera, the tracking module may include a detection unit configured to detect the following target by comparing the depth image and the color image with previously input following target-related information including at least one of a face shape of the following target, color information of clothes worn by the following target, and height information of the following target.

In another aspect of the present disclosure, there is provided a method for searching a following target when failing to track the following target, the method comprising:

estimating a location of the following target based on map information and trajectory information; setting a search range of the following target based on the estimated location information and human walking pattern information; moving to the search range; and tracking the following target.

In an embodiment, the map information may include at least one of building interior structure information, furniture arrangement information and surrounding obstacle location information.

In an embodiment, the trajectory information may be based on at least one of a distance, a direction and a speed with which the following target moves before failing to track the following target.

In an embodiment, the human walking pattern information may be learned through walking pattern data of persons in a surrounding environment, which is accumulated during a predetermined period.

In an embodiment, the search range of the following target may be limited by at least one of a width of a passage, the number of passages and a location of an obstacle, included in the map information.

In an embodiment, the moving to the estimated location may include calculating a moving path of the robot based on the map information.

In an embodiment, the tracking the following target may include receiving a depth image and a color image from a camera; and detecting the following target by comparing the depth image and the color image with previously input following target-related information, which include at least one of a face shape of the following target, color information of clothes worn by the following target, and height information of the following target.

In another aspect of the present disclosure, there is provided a computer program for executing the method for searching a following target when failing to track the following target.

If the method for searching a following target when failing to tracking the following target as proposed herein is used, when it is difficult to track the following target just using sensor information of a human-following robot since time passes after the human-following robot misses the following target, it is possible to track the following target again by estimating a location of the following target based on map information and trajectory information and then searching and utilizing the following target by setting a search range of the following target with the use of human walking pattern information including walking pattern data of persons in a surrounding environment, which is accumulated for a predetermined period.

In addition, it is possible to improve a calculation speed for expecting a moving path by limiting a search range of the following target based on a width of a passage, the number of passages or a location of an obstacle, included in the map information, and the human-following robot may move to an estimated location more rapidly by calculating an optimal route based on the map information.

DETAILED DESCRIPTION

Hereinafter, embodiments are described in detail with reference to the accompanying drawings and the contents recited therein, but the scope of the present disclosure is not limited to the embodiments.

The terms used herein have been selected among general terms widely used in the art at the present in consideration of their functions, but they may be changed according to intention of those skilled in the art, customs, appearance of new technologies or the like. In addition, in a specific case, the applicant has selected a term based on his own discretion, and in this case, its meaning will be described herein. Thus, the terms used herein should be interpreted based on their true meanings and the overall disclosure of this specification, without being limited to its simple name.

In addition, the embodiments described in the specification may be implemented as hardware entirely, hardware partially and software partially, or software entirely. In the specification, the term "unit", "module", "device", "system" or the like indicates a computer-related entity like hardware, a combination of hardware and software, or software. For example, the term "unit", "module", "device", "system" or the like used in the specification may be a process, a processor, an object, an executable file, a thread of execution, a program, and/or a computer, without being limited thereto. For example, both a computer and an application executed in the computer may correspond to the term "unit", "module", "device", "system" or the like in the specification.

Human-following Robot

Figure 1:
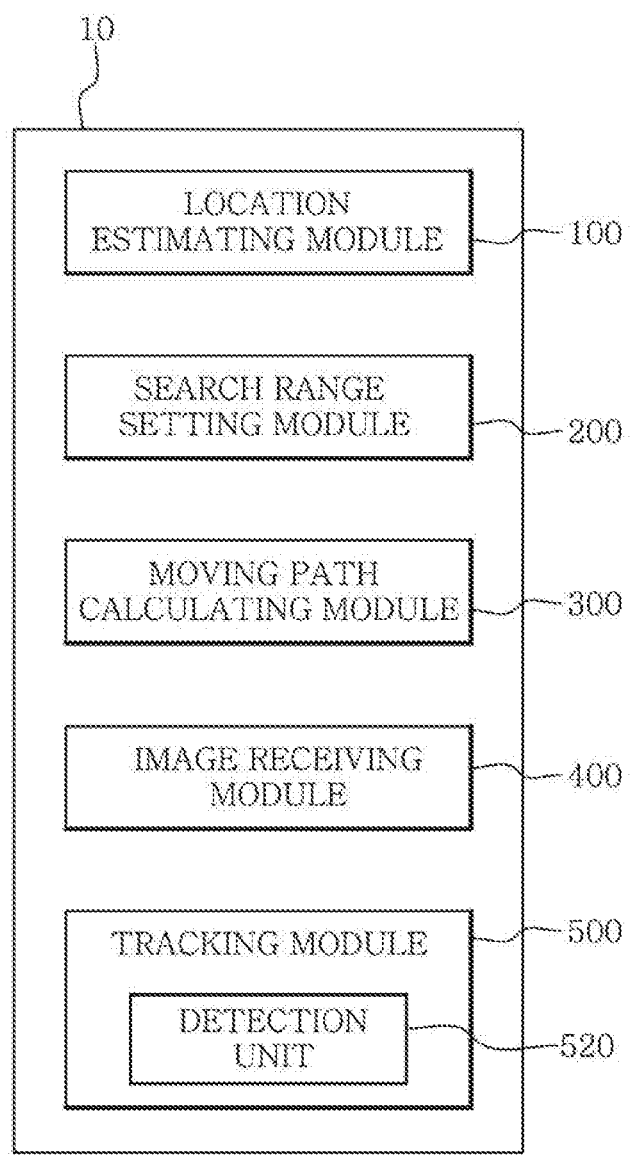
FIG. 1 is a block diagram showing components of a human-following robot for consistently detecting and tracking a following target according to an embodiment.

FIG. 1 is a block diagram showing components of a human-following robot for consistently searching a location of a target to be followed (hereinafter, referred to as a following target) according to an embodiment of the present disclosure.

A human-following robot 10 represents a platform which is programmed to detect a target by obtaining a depth image and a color image with an optical device such as a camera, to be movable in all directions and to be allowed to make interactions with a user, without being limited to a robot having a specific shape or purpose.

When failing to track a following target, the human-following robot 10 may redetect a location of the target by driving to search. In the specification, the term 'following' means an operation of following a target with a predetermined distance therefrom while consistently recognizing and tracking the target by using a detecting module such as a sensor and a tracking module.

The human-following robot 10 includes a location estimating module 100, a search range setting module 200, a moving path calculating module 300, an image receiving module 400 and a tracking module 500. In some embodiments, the robot may further include a receiving module for receiving map information, trajectory information, human walking pattern information or the like from a server, a detecting module for detecting a following target, or an input/output module for user interface.

The location estimating module 100 is used for estimating a location of a following target based on map information and trajectory information. In an embodiment, the map information and the trajectory information may be received from an external server through a wired or wireless network.

Here, the map information represents internal map information of a place (for example, an interior of a shopping mall, an interior of a building opening an exhibition, an interior of a sanatorium, an interior of a school or the like) where the human-following robot 10 tracks a designated target to give service to the target. In an embodiment, the map information may include at least one of building interior structure information, furniture arrangement information, and surrounding obstacle location information. As explained later, the human-following robot 10 may detect or track a following target more rapidly by moving along an optimal route based on detailed internal data such as a furniture arrangement in a building, a location of a surrounding obstacle or the like, included in the map information.

In an embodiment, additional map information may be updated to a server, and the location estimating module 100 may receive the updated map information from the server automatically by periods or manually by users. By doing so, it is possible to cope with the change of surrounding environments, such as the change of a building interior structure, the change of a furniture arrangement for a special event or the like.

The following target to which the human-following robot 10 gives service may be a person who wants to consistently receive information by interaction with a robot, for example a participant in a shopping mall or an exposition, an audience at an exhibition, a patient in a sanatorium, a student or teacher in a school or the like, and information related to the following target (or, following target-related information) may be received through the server or directly input by the user. In an embodiment, the following target-related information may include information capable of identifying the following target, for example face shape information for face-recognition, color information of cloth worn by the following target, height information of the following target or the like, and this information may be used when detecting the following target as explained later.

The trajectory information represents trajectory information according to time along which the following target is estimated to move after a target missing point. The target missing point represents a point where the human-following robot does not recognize the following target through a sensor. In an embodiment, the trajectory information may be based on at least one of a moving distance, a moving direction and a moving speed of the following target before failing to track the following target. In other words, based on a moving pattern (a distance, a direction, a speed or the like) of the following target before the target missing point, a moving route of the following target after failing to track the following target may be predicted.

The location estimating module 100 may be used for tracking a location of a following target according to time, based on the map information and the trajectory information. For example, in FIG. 3, if the following target is moving in a left direction until a point where it is failed to track the following target (or, a target missing point), it may be estimated that the target missing point is highly likely to move to a left passage, rather than a right passage. In an embodiment, the estimated location of the following target may be calculated based on additional information such as a moving distance, a moving speed or the like of a target until a target missing point.

The search range setting module 200 may be used for setting a search range of the following target based on the estimated location information and human walking pattern information. In an embodiment, the human walking pattern information may be received from an external server through a wired or wireless network.

Here, the human walking pattern information represents moving paths of persons in a place (for example, an interior of a shopping mall, an interior of a building opening an exhibition, an interior of a sanatorium, an interior of a school or the like) where the human-following robot 10 tracks a designated target to give service to the target.

In an embodiment, the human walking pattern information may be learned through walking pattern data of persons in a surrounding environment, which is accumulated for a predetermined period. For example, human walking pattern information in a hospital includes walking pattern data learned based on moving paths of persons who have been photographed over one month by a plurality of cameras installed at many locations. This information may include moving path data about a path along which patients frequently move in the hospital building, and in more detail, may include data about paths along which patients of a specific group (for example, a group classified by ages, sexes, diseases or the like) move at a specific time band. In an embodiment, following targets may be grouped based on previous input following target-related information, and a walking pattern of the following targets may be predicted more accurately by using the moving path data of the group.

The search range setting module 200 sets a search range of the following target by using the location information estimated by the location estimating module 100 and the human walking pattern information together.

Figure 3:
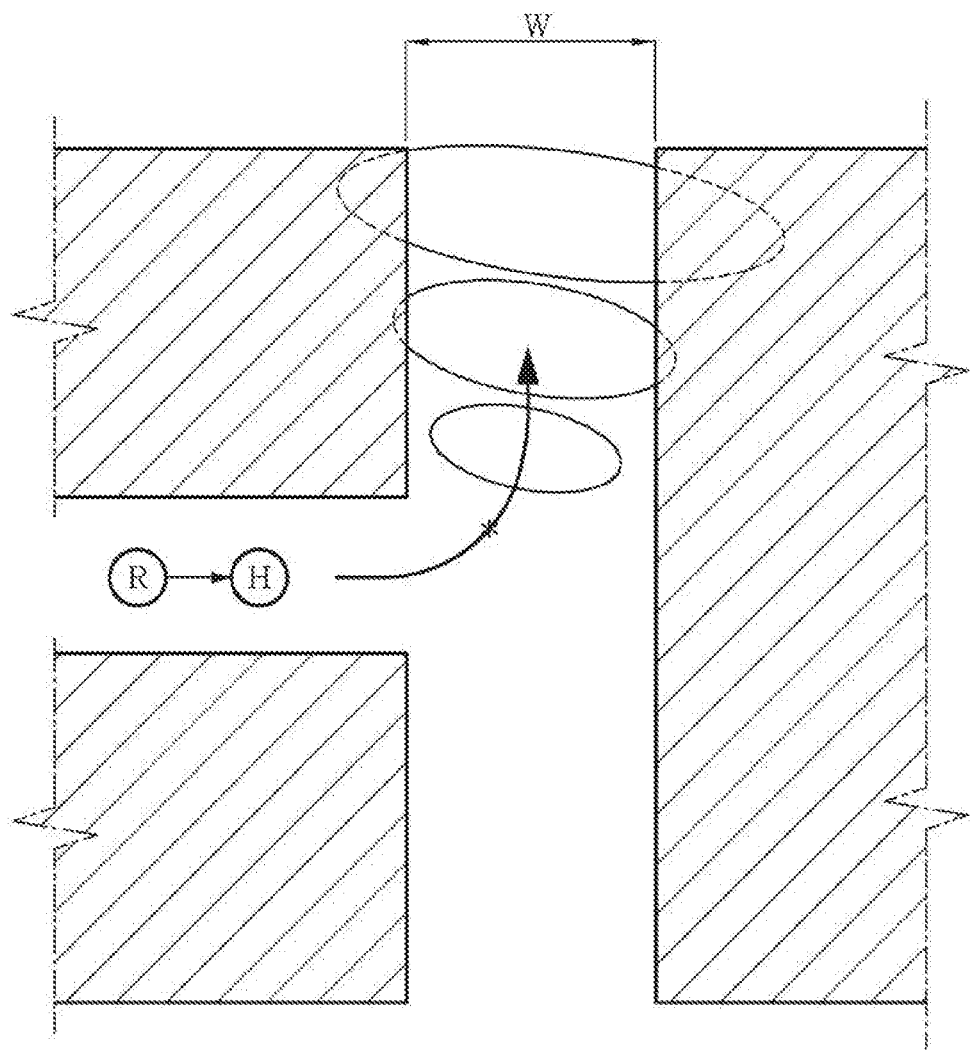
FIG. 3 is a diagram for illustrating a process of setting a search range of a following target from a point where it is failed to track the following target.

The search range is determined by a probability function about a location of the following target, and as shown in FIG. 3, as the path is farther from the target missing point, the range where the following target may be located, namely the range to be searched by the human-following robot, becomes broadened.

In an embodiment, the following target search range may be limited by a width of a passage, the number of passages and a location of an obstacle, included in the map information. For example, referring to FIG. 3, if the width of the search range at a time t is smaller than a width W of the passage included in the map information, the search range becomes broadened as being farther from the target missing point. However, since the following target cannot be located out of the passage, the width of the search range after a time t+1 is limited to the width W of the passage.

Similarly, a range where furniture is arranged or an obstacle is located as in the map information is excluded from the search range. In this way, when a location of the following target is predicted, a redetection speed may be improved by using internal information included in the map information to simplify the calculation of the search range and moving the robot to minimize the search range.

Figure 4:
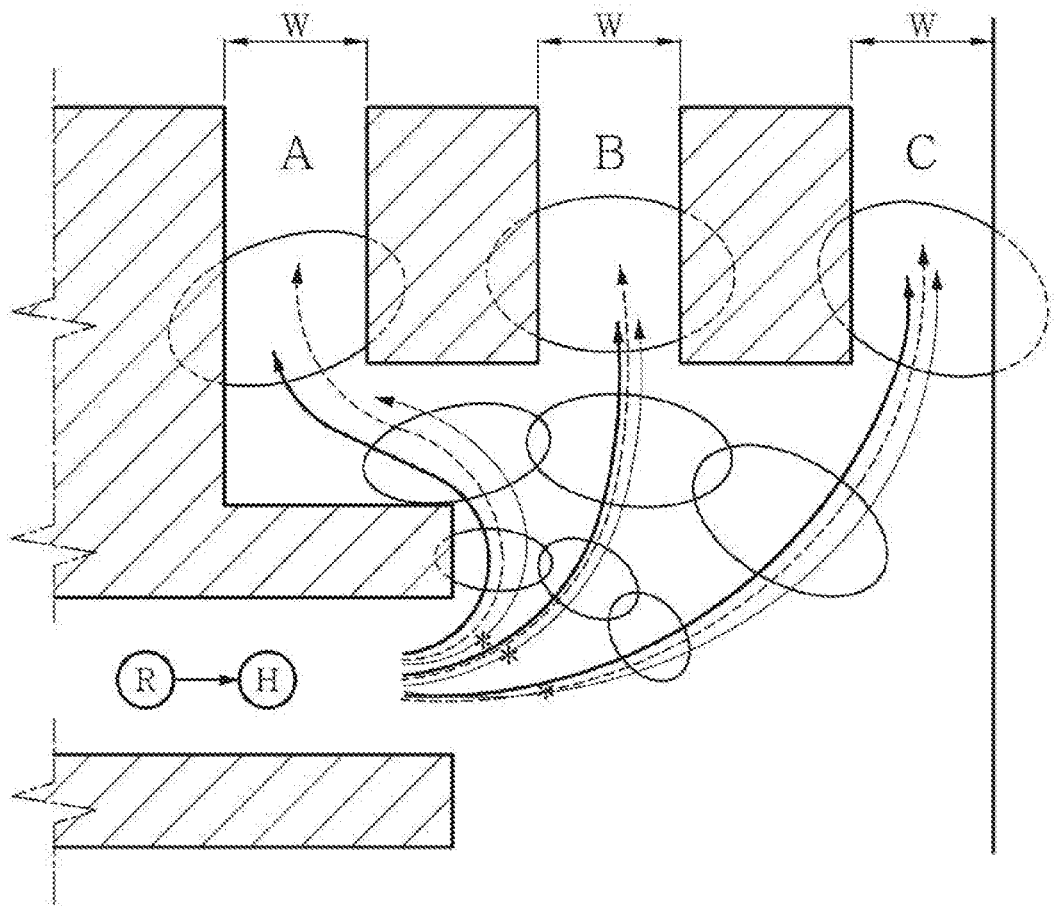
FIG. 4 is a diagram for illustrating a process of setting a search range of a following target when it is failed to track the target in front of road branches according to an embodiment.

FIG. 4 illustrates a process of setting a search range when failing to track a following target at several road branches according to an embodiment. First, as described above, a location of a following target is estimated based on the map information and the trajectory information from a point where the human-following robot fails to track the target. The location estimating module 100 may estimate the location based on the information that the following target is moving in a left direction till the target missing point. Since the passage is diverged into passages A, B, C in a left direction with reference to the map information received from the server, based on this information, it may be expected that the following target would move to any one of passages A, B, C passage (dashed lines in FIG. 4). As shown in FIG. 4, if estimated locations of the following target overlap each other (for example, the passage A and the passage B overlap each other, and the passage B and the passage C overlap each other), it may be limited to specify a direction to be searched by the human-following robot by using just the map information and the trajectory information.

In this case, the search range setting module 200 may set the search range by collectively using the estimated location information and the human walking pattern information (for example, information that most persons move to the passage B as a result of one-month observation). In this case, the search range becomes broadened as being farther from the target missing point, but the width of the search range is limited to the width W of the passage by means of the map information, and among three passages, a passage where the target is highly likely be located based on the walking pattern may be searched first by the robot, as described above.

After that, in order to redetect the following target, the human-following robot moves to a location where the following target is most highly likely to be located, in the search range. In an embodiment, the human-following robot 10 may further include a moving path calculating module 300 for calculating a moving path of the robot based on the map information. The moving path calculating module 300 calculates an optimal moving path for moving to the estimated location of the following target, estimated by the location estimating module 100, in more detail to the search range of the following target, calculated by the search range setting module 200. At this time, the optimal moving path for reaching the estimated location of the following target is determined in consideration of building structure, furniture arrangement, obstacle location or the like, included in the map information received from the server.

In an embodiment, the optimal moving path may be determined as a shortest path to a target point or a path along which the robot may reach the estimated location most rapidly in consideration of additional factors such as congestion, analyzed from the human walking pattern information.

In an embodiment, the human-following robot 10 may further include an avoiding module for avoiding a dynamic obstacle when encountering the dynamic obstacle (a moving obstacle not included in the map information, for example a walker or another human-following robot) while moving to the determined optimal moving path. The avoiding module may reset a moving path of the robot based on front obstacle location information received from a laser sensor, a camera or the like.

Figure 2:
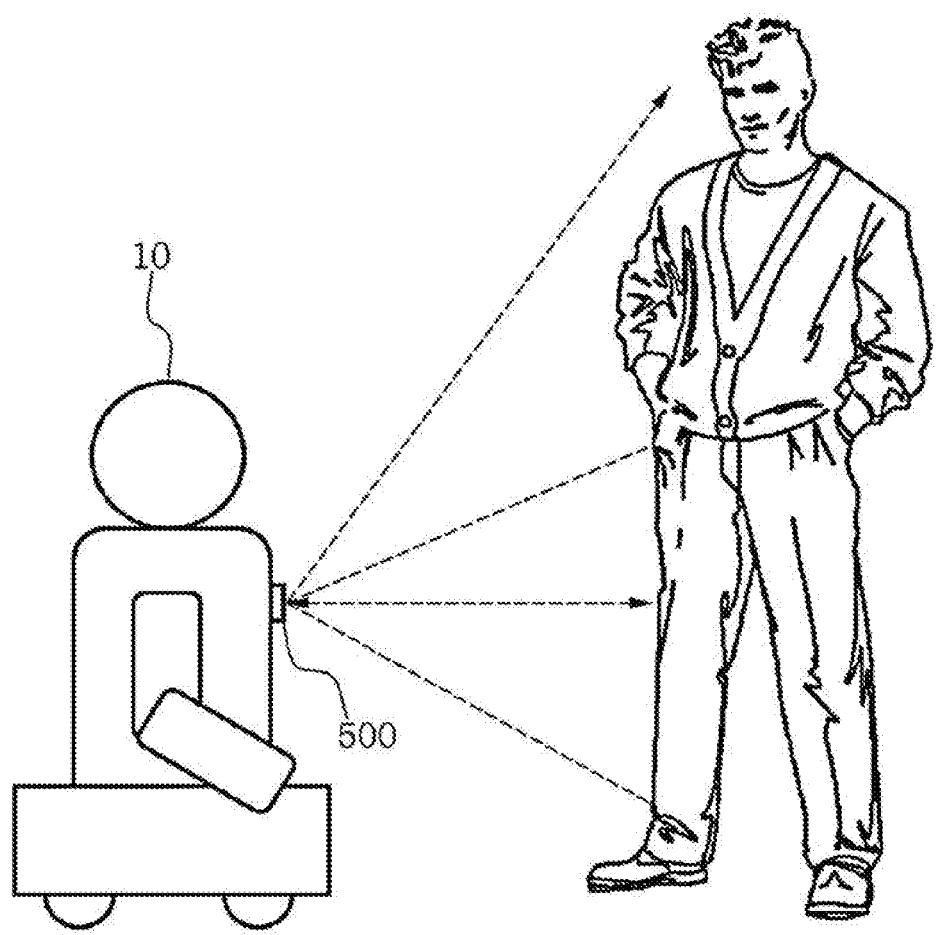
FIG. 2 is a diagram showing a human-following robot for detecting a following target according to an embodiment.

In an embodiment, the human-following robot may further include an image receiving module 400 for receiving a depth image and a color image from the camera. As described above, the depth image and the color image received from the image receiving module 400 may be used while redetecting the following target. Referring to FIG. 2, it is depicted that the human-following robot 10 obtains an image of the following target by using the image receiving module 400 in order to detect the following target.

The image receiving module 400 is used for receiving the depth image and the color image obtained from an optical device such as a camera. In an embodiment, the camera may be a RGB-D camera which outputs a RGB image composed of red (R), green (G) and blue (B) pixels and depth information of an object photographed by the camera (or, a distance from the camera to the object). However, this is just an example, and the camera may also be an aggregate of plural devices in which at least one device for obtaining a color image such as a charge coupled device (CCD) and at least one device for obtaining a depth image such as a lase sensor are separately implemented.

The tracking module 500 is used for redetecting a location of the following target by recognizing the following target while or after moving to the estimated location of the following target. In an embodiment, the tracking module 500 may include a detection unit 520 for detecting the following target by comparing the depth image and the color image received from the image receiving module 400 with previously input following target-related information. In an embodiment, the following target-related information may include at least one of a face shape of the following target, color information of clothes worn by the following target, and height information of the following target.

In an embodiment, the following target-related information may be arbitrarily input by a manager and may also be updated based on image information obtained while the human-following robot 10 is tracking the following target.

In an embodiment, the tracking module 500 may further include an upper body and face detection unit (not shown) for detecting an upper body and a face. The upper body and face detection unit may determine whether the detected target is the following target, by comparing the received image with the previously input face shape of the following target.

In another embodiment, the tracking module 500 may include a lower body candidate detection unit for detecting a lower body candidate, a determination unit for determining whether the detected lower body candidate is a lower body of the following target, and a tracking unit for tracking the lower body when the detected lower body candidate is the lower body of the following target.

More specifically, in the process of tracking a lower body of the following target, the lower body candidate detection unit may detect a lower body candidate groups including a plurality of lower body candidates from the depth image, received by the image receiving module, by means of a random tree technique, and then detect a pair of lower body candidates based on a distance interval of the lower body candidate group. Here, the lower body candidate represents an aggregate of points on a three-dimensional space, which may be recognized as a lower body of a human.

Then, a region corresponding to the detected lower body candidate (or, a "lower body candidate region") may be extracted, and then it may be determined whether the extracted lower body candidate region is the lower body of the following target. In an embodiment, the determination unit may mask the lower body candidate region corresponding to the lower body candidate, and determine whether the masked lower body candidate region is the lower body of the following target, by using a HOG (Histogram of Oriented Gradient) technician and a SVM (Support Vector Machine) classifier.

Then, if the detected lower body candidate is determined as the lower body of the following target, the tracking unit may track a location of the lower body, which is determined as the lower body of the following target. In an embodiment, the tracking unit may consistently update and track a location and direction of the lower body by using at least one of the depth information obtained from the depth image and the color information obtained from the color image. In this case, the location and direction may be updated and tracked by calculating a future location, direction and speed of the lower body at segmented time intervals by using the already calculated location, direction and speed of the lower body. In addition, the location and direction may be updated and tracked by using a Kalman filter or a particle filter.

The upper body and face detection unit and the units for tracking the lower body may be operated simultaneously or individually to detect the following target.

In an embodiment, the tracking unit may continuously track the following target by changing a weight on color and location based on the period of time after the following target is missed. For example, if long time has passed after failing to track the following target, the color weight may be increased so that subjects having similar colors to the color at the time of final detection may be intensively tracked. In another example, if short time has passed after detection failure or detection is performed successively, the location weight may be increased so that persons may be tracked according to similarity in distance even though there is a color difference. By doing so, even in a complicated environment with a large population, a missed following target may be redetected more rapidly.

In an embodiment, the modules and units for performing the target tracking process may be entirely or partially provided out of the human-following robot 10. In this case, the processes of estimating a location of the following target based on the received map information and human walking pattern information, calculating an optimal moving path and detecting a lower body based on the received image may be entirely or partially calculated out of the human-following robot 10, and the calculated results may be entirely or partially transmitted to the robot 10 to redetect the following target.

Figure 5:
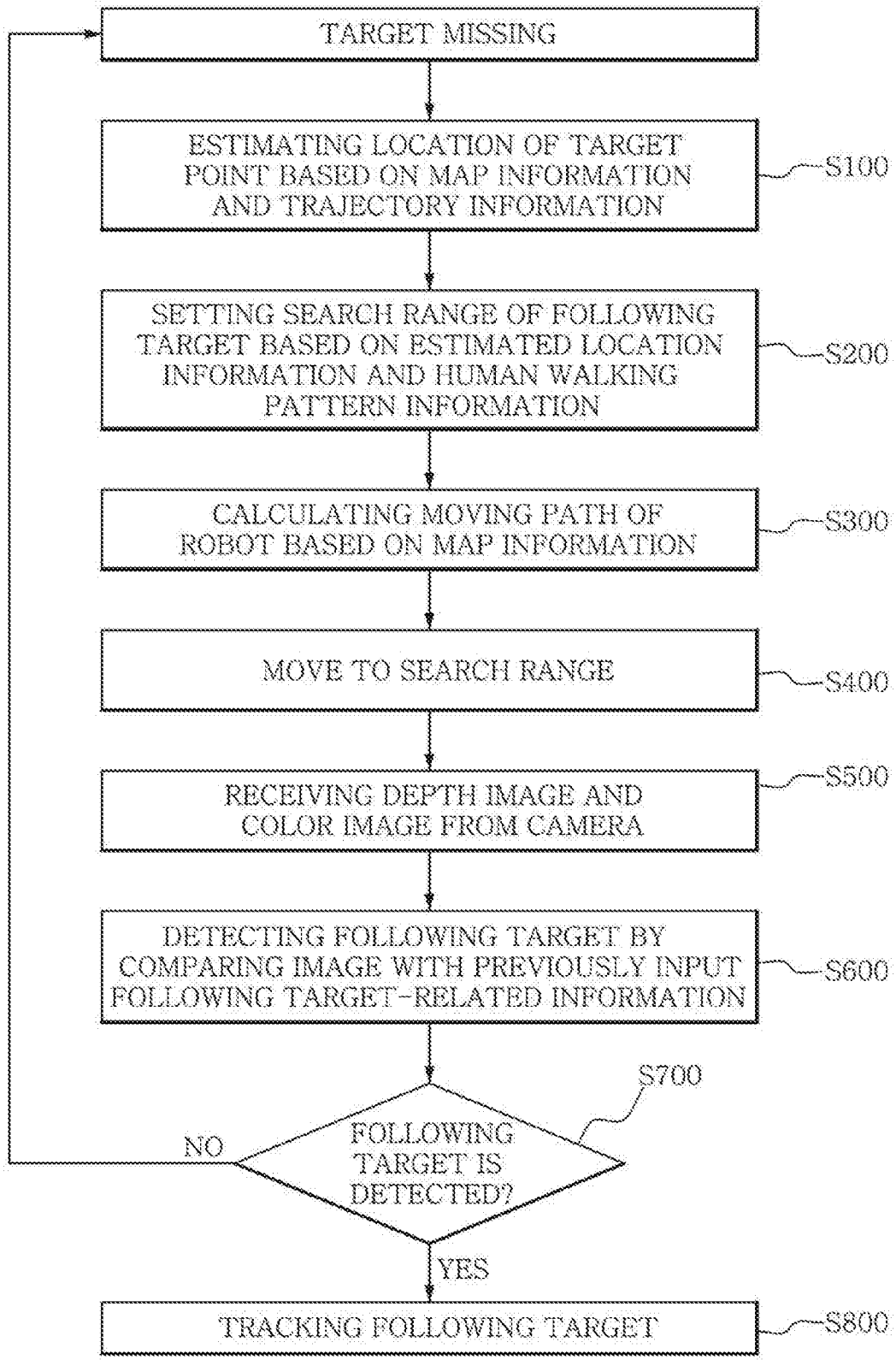
FIG. 5 is s flowchart for illustrating a method for searching a following target when failing to tract the following target according to an embodiment.

Method for Searching a Following Target when Failing to Track a Following Target FIG. 5 is s flowchart for illustrating a searching method for redetecting a following target according to an embodiment.

First, a location of a following target is estimated based on the map information and the trajectory information (S100). In an embodiment, the map information and the trajectory information may be received from an external server through a wired or wireless network.

Here, the map information may include internal map information of a place (for example, an interior of a shopping mall, an interior of a building opening an exhibition, an interior of a sanatorium, an interior of a school or the like) where a target is tracked to give service to the target. In an embodiment, the map information may include at least one of building interior structure information, furniture arrangement information, and surrounding obstacle location information.

In an embodiment, additional map information may be updated to a server, and the updated map information may be received from the server automatically by periods or manually through an information receiving module. By doing so, it is possible to cope with the change of surrounding environments, such as the change of a building interior structure, the change of a furniture arrangement for a special event or the like.

The trajectory information represents trajectory information according to time along which the following target is estimated to move after a target missing point. The target missing point represents a point where the following robot does not recognize the following target through a sensor. In an embodiment, the trajectory information may be based on at least one of a moving distance, a moving direction and a moving speed of the following target before failing to track the following target. In other words, based on a moving pattern (a distance, a direction, a speed or the like) of the following target before the target missing point, a moving route of the following target after failing to track the following target may be predicted. The method for estimating a location of the following target based on the map information and the trajectory information is described above with reference to FIG. 3 and is not described again here.

As described above with reference to FIG. 4, if it is impossible to specify the location of the following target just by the map information and the trajectory information (if the passages overlap each other in FIG. 4), a search range of the following target is set based on the estimated location information and human walking pattern information (S200).

Referring to FIG. 4, an estimated location is calculated in consideration of the possibility that the following target moves to a left passage, and also the walking pattern information in the corresponding building during a predetermined period (for example, information that most persons move to the passage B as a result of one-month observation) is considered together to calculate the search range of the following target.

The search range is determined by a probability function about a location of the following target, and as the path is farther from the target missing point, the range where the following target may be located, namely the range to be searched by the human-following robot, becomes broadened. In addition, the following target search range may be limited by a width of a passage, the number of passages and a location of an obstacle, included in the map information, as described above. Similarly, a range where furniture is arranged or an obstacle is located as in the map information is excluded from the search range. By simplifying the calculation of the search range and minimizing the search range in this way, the human redetection speed may be improved.

Then, the robot is moved to the estimated location (S400). In an embodiment, the estimated location may be included in the search range of the following target, calculated in consideration of the estimated location of the following target and the human walking pattern data together.

In an embodiment, before Step S400, an optimal moving path for moving to the estimated location of the following target in consideration of building structure, furniture arrangement, obstacle location or the like, included in the map information received from the server, may be further determined (S300). Here, the optimal moving path may be determined as a shortest path to a target point or a path along which the robot may reach the estimated location most rapidly in consideration of additional factors such as congestion, analyzed from the human walking pattern information, as described above.

In an embodiment, if a dynamic obstacle (a moving obstacle not included in the map information, for example a walker or another human-following robot) is encountered while moving to the determined optimal moving path, a step of avoiding the dynamic obstacle may be further performed. In this step, a process of resetting a moving path of the robot based on front obstacle location information received from a laser sensor, a camera or the like may be performed.

Then, the robot may receive depth image and color image acquired by camera (S500). Then, the following target is detected by comparing the depth image and the color image with previously input following target-related information (S600). Step S600 may be performed while or after moving to the estimated location of the following target, and this step is performed as the tracking module recognizes following target and then redetects and re-tracks a location of the following target.

In an embodiment, the following target-related information may include at least one of a face shape information of the following target, color information of clothes worn by the following target, and height information of the following target. In an embodiment, the following target-related information may be arbitrarily input by a manager and may also be updated based on image information obtained while the following target is being tracked before Step S100.

The technique of detecting and tracking an upper body and face and/or lower body candidate of the following target from the depth image and the color image has been described in detail above and thus is not explained in detail here.

Finally, it is determined whether the detected subject is the following target (S700). If the detection result is identical to the following target, the target is continuously tracked and estimated. However, if the detection result is not identical to the following target, an estimated location and a search range are searched continuously. If the following target is not located within the search range as a result of search for the search range, it is regarded that tracking is failed, and Steps S100 to S600 are repeated.

The method for searching a following target when failing to tract the following target may be implemented as an application or program commands executable by various kinds of computer means and recorded on a computer-readable recording medium. The computer-readable recording medium may include program commands, data files, data structures or the like solely or in combination. The program commands recorded on the medium may be specially designed or configured for the present disclosure or known to and available by computer software engineers.

The computer-readable recording medium includes, for example, magnetic media such as a hard disk, a floppy disk and a magnetic tape, optical media such as CD-ROM and DVD, magneto-optical media such as a floptical disk, hardware devices such as ROM, RAM and a flash memory, specially configured to store and perform program commands, or the like. The program commands include not only machine codes made by a complier but also high-level language codes executable by a computer by using an interpreter. The hardware device may be configured to operate as at least one software module to perform the operations of the present disclosure, or vice versa.

In addition, even though the embodiments have been illustrated and explained, it should be understood that the present disclosure is not limited to the specific embodiments but can be modified in various ways without departing from the scope of the claims by those having ordinary skill in the art.

What is claimed is:

1. A robot for following a target, the robot comprising: a processor configured to:
   estimate a location of the target based on map information and a trajectory of the target when the target is lost; set a search range for the target based on the estimated location and human walking pattern information; and track the target after the robot moves to the search range, wherein the human walking pattern information is based on observed walking paths of people in a same environment in which the target is lost, wherein the human walking pattern information includes data about paths along which people of a specific group move at a specific time band, and wherein the search range is set based on the path data of the people in the specific group to which the target belongs, and wherein the processor is further configured to change a weight of color related to the target.

2. The robot according to claim 1, wherein the map information includes any one or any combination of any two or more of building interior structure information, furniture arrangement information, and surrounding obstacle location information.

3. The robot for according to claim 1, wherein the trajectory information is based on any one or any combination of any two or more of a distance, a direction, and a speed with which the target moves before the robot fails to track the target.

4. The robot according to claim 1, wherein the human walking pattern information is accumulated during a period of time.

5. The robot according to claim 1, wherein the search range is limited by the map information, and the map information includes any one or any combination of any two or more of a width of a passage, a number of passages, and a location of an obstacle.

6. The robot according to claim 1,
   wherein the processor is further configured to calculate a moving path of the robot based on the map information.

7. The robot according to claim 1, wherein the processor is further configured to:
   receive a depth image and a color image from a camera, and
   detect the target by comparing the depth image and the color image with previously input target-related information,
   wherein the target-related information includes any one or any combination of any two or more of a face shape of the target, color information of clothes worn by the target, and height information of the target.

8. A method for a robot to following a target, the method comprising: estimating a location of the target based on map information and a trajectory of the target when the target is lost; setting a search range for the target based on the estimated location and human walking pattern information; and tracking the target after the robot moves to the search range, and change a weight of color related to the target;
   wherein the human walking pattern information is based on observed walking paths of people in a same environment in which the target is lost wherein the human walking pattern information includes data about paths along which people of a specific group move at a specific time band, and wherein the search range is set based on the path data of the people in the specific group to which the target belongs.

9. The method according to claim 8, wherein the map information includes any one or any combination of any two or more of building interior structure information, furniture arrangement information, and surrounding obstacle location information.

10. The method according to claim 8, wherein the trajectory information is based on any one or any combination of any two or more of a distance, a direction, and a speed with which the target moves before the robot fails to track the target.

11. The method according to claim 8, wherein the human walking pattern information is accumulated during a predetermined period.

12. The method according to claim 8, wherein the search range is limited by the map information, and the map information includes any one or any combination of any two or more of a width of a passage, a number of passages, and a location of an obstacle.

13. The method according to claim 8, wherein the moving to the estimated location includes calculating a moving path of the robot based on the map information.

14. The method according to claim 8, wherein
the tracking of the target includes receiving a depth image and a color image from a camera, and detecting the target by comparing the depth image and the color image with previously input target-related information, and
the target-related information includes any one or any combination of any two or more of a face shape of the target, color information of clothes worn by the target, and height information of the target.

15. A non-transitory computer-readable medium storing instructions that, when executed by a processor, cause the processor to perform the method according to claim 8.

16. The method of claim 8, wherein the target is lost when the robot ceases to recognize the target through sensor data.

17. The method of claim 8, wherein the search range is positioned on an extrapolation of the trajectory.

18. The method of claim 17, where the search range is positioned at a distance along the extrapolation of the trajectory, and the trajectory is based on a moving speed of the target when the target is lost.

19. The method of claim 8, wherein the setting of the search range comprises:
in response to detecting multiple passageways, predicting respective paths of the target leading into the passageways,
selecting a passageway, among the passageways, that the target is determined to be most likely to enter based on the trajectory, and
designating a search range positioned on a path, among the predicted respective paths, leading into the selected passageway.

20. The robot according to claim 1, wherein weight of color related to the target, is changed when tracking the target is changed based on a period of time that has passed after the target is lost.

\* \* \* \* \*